(12) United States Patent
Molina Hernandez et al.

(10) Patent No.: US 10,750,118 B2
(45) Date of Patent: *Aug. 18, 2020

(54) USING METADATA FOR DC OFFSET CORRECTION FOR AN AC-COUPLED VIDEO LINK

(71) Applicant: Analog Devices Global Unlimited Company, Hamilton (BM)

(72) Inventors: Isaac Molina Hernandez, Valencia (ES); Niall D. O'Connell, Clarina (IE); Sean M. Mullins, Limerick (IE)

(73) Assignee: Analog Devices Global Unlimited Company, Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 16/566,135

(22) Filed: Sep. 10, 2019

(65) Prior Publication Data

US 2020/0137350 A1     Apr. 30, 2020

Related U.S. Application Data

(63) Continuation of application No. 16/172,362, filed on Oct. 26, 2018.

(51) Int. Cl.
| | |
|---|---|
| *H04N 7/08* | (2006.01) |
| *H04N 7/14* | (2006.01) |
| *H04N 11/08* | (2006.01) |
| *H04N 9/81* | (2006.01) |
| *H04N 21/4363* | (2011.01) |

(52) U.S. Cl.
CPC .......... *H04N 7/0803* (2013.01); *H04N 7/147* (2013.01); *H04N 9/81* (2013.01); *H04N 11/08* (2013.01); *H04N 21/43632* (2013.01)

(58) Field of Classification Search
CPC ........ H04N 7/0803; H04N 7/147; H04N 9/81; H04N 11/08; H04N 21/43632
See application file for complete search history.

(56) References Cited

U.S. PATENT DOCUMENTS

| | | |
|---|---|---|
| 7,295,578 B1 | 11/2007 | Lyle et al. |
| 1,025,121 A1 | 4/2019 | Tan et al. |
| 2005/0249178 A1 | 11/2005 | Bolgiano |

(Continued)

OTHER PUBLICATIONS

Non-Final Office Action issued in U.S. Appl. No. 16/174,356 dated Nov. 19, 2019, 9 pages.

(Continued)

*Primary Examiner* — Michael E Teitelbaum
(74) *Attorney, Agent, or Firm* — Patent Capital Group

(57) ABSTRACT

Disclosed herein are systems and methods for performing DC offset correction of a video signal received over an AC-coupled video link. In one aspect, a transmitter is configured to compute, and provide to a receiver, metadata indicative of a statistical characteristic (e.g., an average or a sum of values) for a group of active pixels of a video signal acquired by a camera. The receiver is configured to compute an analogous statistical characteristic on the video signal received over an AC-coupled video link, and to perform DC offset correction by modifying one or more values of the received video signal based on a comparison of the statistical characteristic computed by the receiver and the one computed by the transmitter and indicated by the received metadata.

20 Claims, 5 Drawing Sheets

(56) References Cited

U.S. PATENT DOCUMENTS

2010/0309382 A1 12/2010 Matsubayashi
2012/0280796 A1 11/2012 Gravelle et al.

OTHER PUBLICATIONS

U.S. Appl. No. 16/172,362, filed Oct. 26, 2018, Using Metadata for DC Offset Correction for an AC-Coupled Video Link.
U.S. Appl. No. 16/175,101, filed Oct. 30, 2018, Methods and Devices for Compensating SAG Effect.
U.S. Appl. No. 16/174,356, filed Oct. 30, 2018, High Definition Analog Video and Control Link for Automotive Applications.

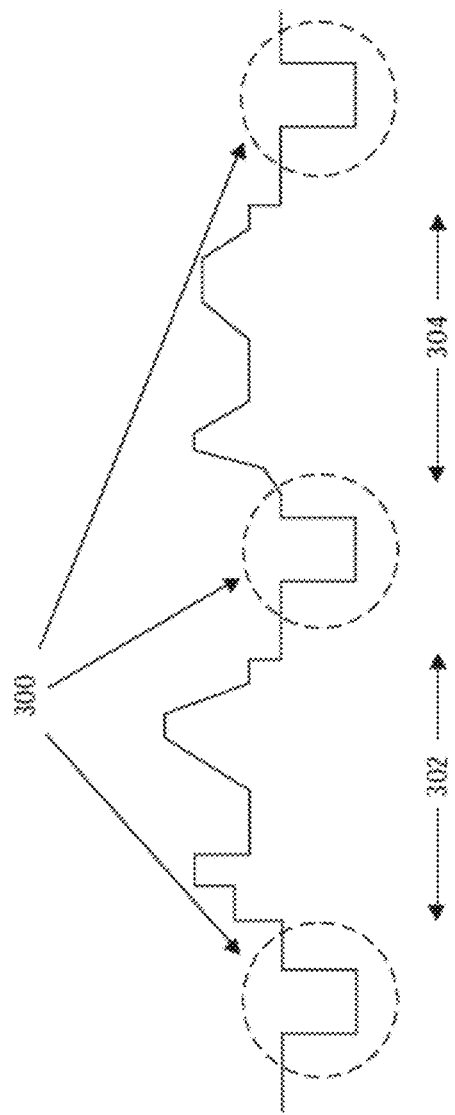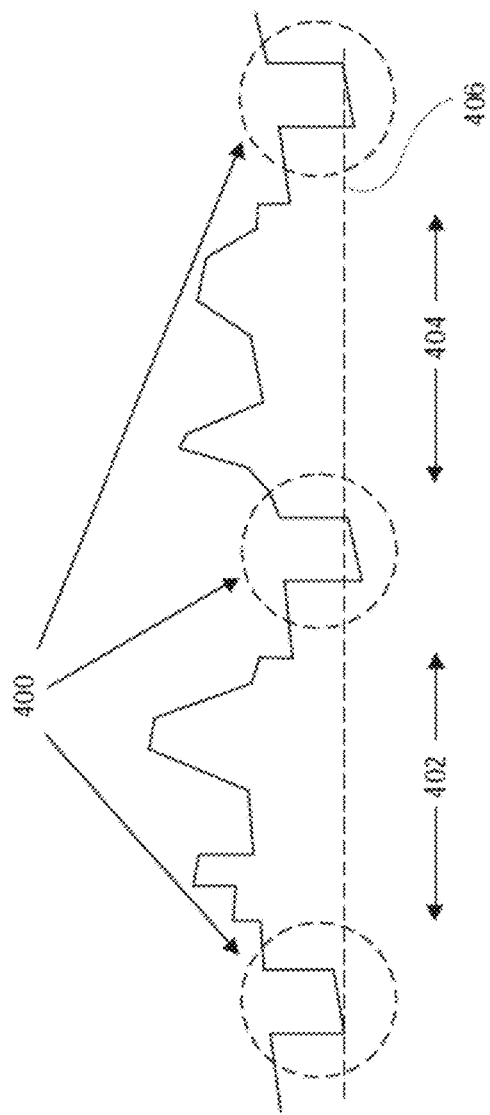

USING METADATA FOR DC OFFSET CORRECTION FOR AN AC-COUPLED VIDEO LINK

CROSS-REFERENCE TO RELATED APPLICATIONS

This application claims the benefit of and priority from U.S. patent application Ser. No. 16/172,362 filed 26 Oct. 2018, entitled "USING METADATA FOR DC OFFSET CORRECTION FOR AN AC-COUPLED VIDEO LINK", incorporated herein by reference in its entirety.

TECHNICAL FIELD OF THE DISCLOSURE

The present disclosure relates to the field of video signal transmission, and in particular to analog video signal transmission over alternating current (AC)-coupled channels.

BACKGROUND

Video-based applications which rely on real-time video information acquisition, such as automotive infotainment, automotive driver assistance systems (ADAS), self-driving vehicles and security surveillance systems, generally involve the capture and generation of video data by one or more cameras. Such cameras may include, for example, charge-coupled devices (CCDs), complementary metal-oxide-semiconductor (CMOS) image sensors, or any other suitable video capturing devices which, broadly speaking, translate photons incident thereon into digital (raw or pixel) video data. In such applications, the video data will usually have to be transmitted in real-time from the camera to other devices for processing. Such devices may include, for example, electronic control units (ECUs) or components in communications or alerting systems. Such devices may, for example, execute specialized software to perform processing and analytical tasks based on the acquired image and/or video data and provide outputs accordingly. The combination of layers of transmission infrastructure enabling the transfer of the data between the camera and the video data receiving device/processor may be referred to as a "video link" or a "camera link."

A variety of factors can affect the cost, quality and robustness of a video link. Physical constraints such as space/surface area and also regulations can pose further constraints to the video link requirements or specifications, and thus trade-off and ingenuity will have to be exercised.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a schematic depiction of a video signal during an ideal transmission in which the signal is not subject to the signal amplitude gain (SAG) effect;

FIG. 4 is a schematic depiction of a video signal exhibiting the SAG effect during transmission over an AC-coupled system;

DESCRIPTION OF EXAMPLE EMBODIMENTS OF THE DISCLOSURE

Overview

Figure 1:
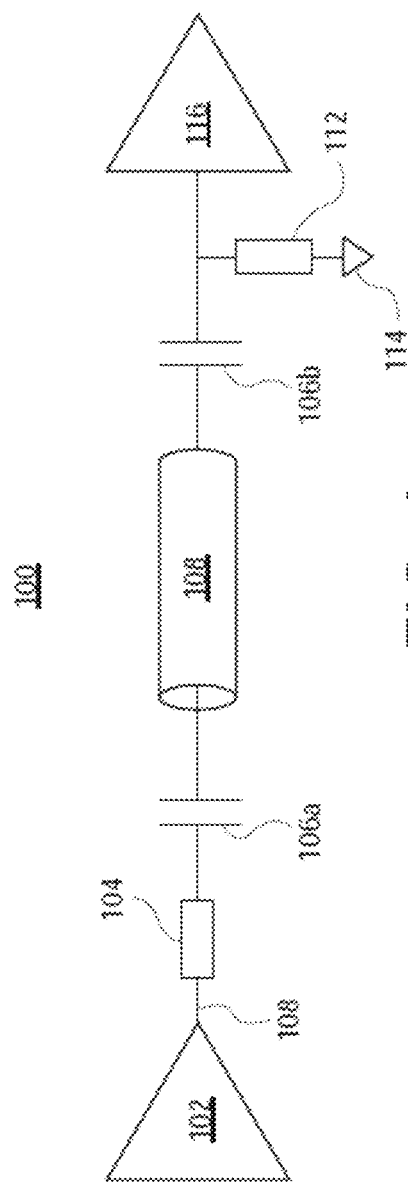
FIG. 1 shows a schematic example of an AC-coupled circuit in a single-ended transmission scheme in accordance with some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Disclosed herein are systems and methods for performing DC offset correction of a video signal received over a wired, AC-coupled video link. Such systems and methods may be particularly suitable for, but are not limited to, being used in a vehicle (where the term "vehicle" includes not only wheeled vehicle such as a car, a truck, or a bus, but also includes an airplane, an aircraft, or a spacecraft, for example), in a surveillance system, or in any other environment where a transmitter, placed at one location within such an environment (e.g., within a vehicle) and configured to receive a video signal acquired by an image sensor in a camera that is communicatively coupled to the transmitter, and a receiver, placed at another location within such an environment, may need to communicate video signals and other data with one another over a wired link. Furthermore, while this disclosure mainly describes video links and video signals, other types of signals such as audio, image, or any combination thereof, which are transmitted over an AC-coupled analog transmission channel may be corrected on the receiver side using the metadata transmitted by the transmitter, as disclosed herein.

In one aspect of the present disclosure a system is provided, in which a transmitter is configured to compute, and provide to a receiver, metadata indicative of a statistical characteristic (e.g., an average or a sum of values) for a group of active pixels of a portion video signal acquired by a camera (i.e., the transmitter is configured to compute the statistical characteristic on the video signal before the signal is transmitted over the AC-coupled video link). The receiver is configured to compute an analogous statistical characteristic on the video signal received at the receiver over an AC-coupled video link, and to perform DC offset correction by correcting one or more values of the received video signal based on a comparison of the statistical characteristic computed by the receiver and the one computed by the transmitter (as indicated by the metadata received from the transmitter), before rendering the received video signal for display. Such an approach advantageously allows using more data points to perform DC offset correction, enabling an improvement with respect to the extent to which the video signal as recovered at the receiver side resembles that acquired by the camera at the transmitter side, resulting in an improved quality of the rendered video.

Other aspects of the present disclosure provide methods for operating such a system, as well as computer-readable storage media storing instructions which, when executed by a hardware processor, cause the processor to carry out the methods of using metadata to enable DC offset correction of a video signal following transmission of the video signal over an AC-coupled video link.

As will be appreciated by one skilled in the art, aspects of the present disclosure, in particular aspects of DC offset correction of AC-coupled signals using metadata as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing analog transmission systems, in particular—analog video transmission systems that use AC-coupling, including transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Other features and advantages of the disclosure will be apparent from the following description and the claims.

Analog Vs Digital Video Transmission

In systems requiring the transfer of video data between system elements (e.g., between an image sensor and a processor implemented at a certain distance from the image sensor), such as surround view ADAS or (security) surveillance systems, the video data acquired by a camera can be transmitted in digital form, e.g., as a serialized digital bit stream, which can be, e.g., as RAW data as acquired by the image sensor or in some processed form, e.g., YUV data produced by an image system processor (ISP) performing de-mosaicking on the RAW image sensor data. Alternatively, the video data acquired by a camera may be converted and formatted into an analog signal prior to transmission, and then transmitted in analog form.

Analog video signal transmission can be advantageous when contrasted to digital transmission. The serialized nature of digital transmission results in digital transmission requiring higher bandwidth than analog transmission. To satisfy the higher bandwidth requirement, more expensive infrastructure is required. Also, while bit accuracy is maintained in digital transmission and may be compromised in analog transmission, the impact of errors that do occur in a digital transmission can be much more impactful than those that occur in analog transmission in terms of the output video quality. Thus, transmitting the original digital video data as an analog signal offers several advantages over digital signal transmission. A system based around analog transmission may offer reduced cost and a more robust transmission. Thus, while the image sensor will generally output digital video data, this may be converted into an analog signal for transmission over an analog video link to a receiver for further processing.

AC-Coupled Vs DC-Coupled Analog Transmission

In implementing analog signal transmission over a wired transmission line, a choice can be made between AC and DC-coupling (the latter also referred to as "conductive coupling").

AC-coupling requires the use of at least one coupling capacitor, which is an additional component compared to DC-coupling where such capacitors are not required. An AC-coupled wired transmission line between a transmitter and receiver typically includes a first coupling capacitor, placed after the transmitter and prior to the transmission channel, and a second coupling capacitor, placed after the transmission channel and prior to the receiver. The term "coupling capacitor" as used herein may refer to one or more coupling capacitors. By contrast, in DC-coupling, only resistors or simply wire(s), and no coupling capacitors, are used and, therefore, DC-coupling is generally favored due to its simpler implementation and lower cost and space requirements.

Furthermore, the coupling capacitor(s), together with the termination resistors at either end and with the impedance of the wired transmission cable, may act as a high-pass filter and, thus, may attenuate the transmission of lower frequency components of the analog signal. This is relevant to the transmission of video signals, as the frequency spectrum of such signals often includes DC level and low-frequency elements which would be vulnerable to such high-pass filtering, resulting in loss or distortion of picture information. Thus, it is desirable that a video signal can be preserved down to very low frequency and down to the DC level components. This means that coupling capacitor(s) used for AC-coupling may need to be very large in order to minimize the cutoff frequency of the high-pass filter formed with the receiver termination. Some implementations of AC-coupling may require capacitances as large as about 220 microfarad (uF) to preserve those lower frequency components. Therefore, AC-coupling may be regarded as an undesirable option due to prohibitively large capacitor size requirements.

However, AC-coupling can be advantageous in certain applications as it provides improved tolerance against some fault conditions. This is the case, for example, in automotive/vehicle applications, in which reducing the risk of damage during a short-to-battery (STB) fault condition may be a motivation for AC-coupled video links because, as they block DC voltage levels, AC-coupled links are intrinsically resistant to STB faults. On the other hand, DC-coupling of the transmitter output buffer to the transmission medium can be challenging due to the requirement to be robust to STB fault conditions, which may require the transmitter devices to be designed and manufactured on a high-voltage semiconductor process technology, which is typically more expensive than standard (low-voltage) semiconductor processes technology. Thus, transmitting video signals in an AC-coupled analog signal format can be a cost-effective and robust transmission option, particularly in automotive applications.

Single-Ended Vs Differential-Pair AC-Coupled Analog Transmission

An AC-coupled transmission line for transfer of video data can be implemented according to either a single-ended or a differential-pair transmission scheme. In some implementations, differential-pair video transmission may be particularly advantageous as it may benefit from a stronger immunity to noise compared to single-ended video transmission.

In a single-ended implementation of an AC-coupled transmission line, a respective coupling capacitor may be placed in each of the two sides of a single-ended transmission line, i.e., one coupling capacitor between a transmitter and a conductor cable of the line, and another coupling capacitor between that conductor cable and a receiver. In a differential implementation of an AC-coupled transmission line, a respective pair of coupling capacitors may be placed in each of the two sides of a differential-pair transmission line, i.e., a pair of coupling capacitors between a transmitter and a conductor cable of the line, and another pair of coupling capacitors between that conductor cable and a receiver. In various embodiments, a conductor cable (or simply "cable") may be implemented in any suitable cabling scheme, e.g., as a single conductor (i.e., a conductor wire), as a coaxial cable, or as a dual conductor such as unshielded twisted pair (UTP) or STP (shielded twisted pair), depending on the transmission scheme used (i.e., depending on whether the transmission scheme is single-ended or differential). In some embodiments, the cable of a video transmission channel may include an RCA-type cable or a coaxial cable (which includes a signal wire at least partially enclosed within a shield of conductive material), or an unshielded AVSS, CIVUS or similar signal wire, within a shielded bundle.

Figure 2:
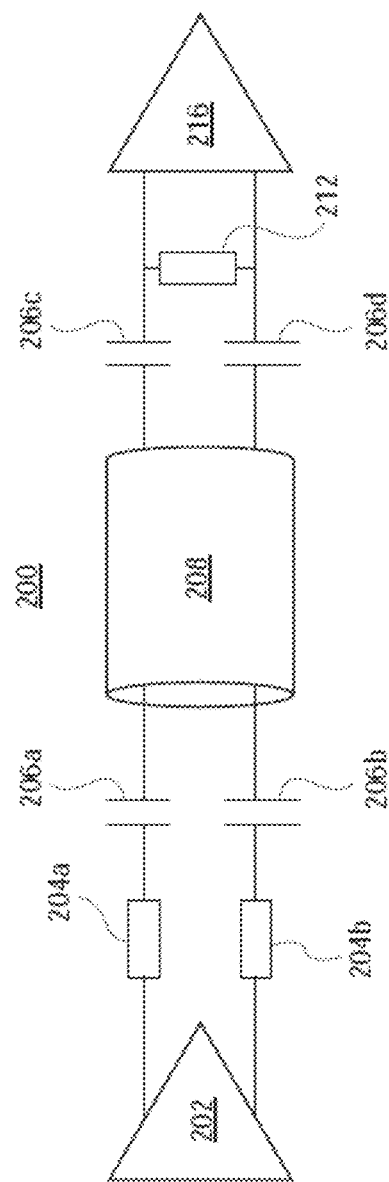
FIG. 2 shows a schematic example of an AC-coupled circuit in a differential transmission scheme in accordance with some embodiments of the present disclosure.

FIGS. 1 and 2 show schematic examples of a single-ended and a differential-pair transmission channels, respectively.

In an AC-coupled transmission scheme 100 shown in FIG. 1, a signal, which may comprise an analog-formatted video signal, is transmitted over a single conductor cable 108, which may be seen as a transmission channel 108. In some embodiments, the conductor cable 108 may include a simple conducting wire. In some embodiments, the conductor cable 108 may include a coaxial cable that includes a core conductive wire and a conductive shield, with the core wire carrying the video signal and the shield being grounded. Since the transmission scheme 100 is a single-ended signaling transmission scheme, only a first wire carries a varying voltage between the transmitter and receiver, while a second wire conductor (not shown in FIG. 1) may be connected to and carry a reference voltage signal (such as that provided by a ground reference 114 shown in FIG. 1). As shown in FIG. 1, the conductor cable 108 connects a transmitter 102 and a receiver 116. In this scheme, one or more coupling capacitors 106a, 106b may be connected between transmitter 102 and receiver 116. In particular, one or more coupling capacitors 106a may be connected between the transmitter 102 and the conductor cable 108, and one or more coupling capacitors 106b may be connected between the conductor cable 108 and the receiver 116. The transmitter 102 may exhibit a total resistance 104 while the receiver 116 may exhibit a total resistance 112, which are in serial connection with the transmitter 102.

Alternatively, in an AC-coupled transmission scheme 200 shown in FIG. 2, a signal, which may comprise an analog-formatted video signal, is transmitted over a differential-pair conductor cable 208, which may be seen as a transmission channel 208. In some embodiments, the conductor cable 208 may include a UTP or an STP cable. While single-ended implementation can be advantageous due to its simpler implementation and lower cost, differential-pair signaling transmission schemes may advantageously offer resistance to external electromagnetic interference (EMI) and reduce the amount of electromagnetic emissions produced by the link. This is because the properties of the two separate signals/lines of the differential-pair of lines can be selected so as to provide cancellation of common mode interfering signals. As shown in FIG. 2, a transmitter 202, which may exhibit resistances 204a and 204b (serially connected to the transmitter 202) in the two lines of the differential-pair scheme, is connected to the conductor cable 208 via a pair of coupling capacitors 206a, 206b. Similarly, a receiver 216 is coupled to the conductor cable 208 via a resistance 212 (in parallel connection with the receiver 216) and a pair of coupling capacitors 206c, 206d.

Undesirable Effects of AC-Coupling

As shown in FIGS. 1 and 2, both the transmitter and receiver may be AC-coupled to the conductor cable or wire (the terms wire and cable may be used interchangeably herein). While AC-coupling (whether in a single-ended or a differential-pair implementation) may provide significant robustness, risk and cost benefits, particularly on the transmitter side, it may also present significant challenges in transmission of analog video data.

As briefly described above, one source of the challenges is due to the presence of coupling capacitors used for AC-coupling, because such capacitors form high-pass filters with the termination resistors at either end of the conductor cable. For example, in a 50 Ohm system with 1 uF coupling capacitors, the cutoff frequency of the high-pass response may be about 3 kilohertz (kHz), which means that signal components with frequencies below 3 kHz cannot be transmitted through the coupling capacitors. Increasing the size of the coupling capacitors may somewhat decrease the cutoff frequency, but that is not always possible or feasible due to, e.g., cost and space considerations (e.g., the maximum size of the coupling capacitors may be limited by the available board space).

Not being able to pass signal components below a certain frequency is particularly problematic for video signals, the spectral content of which often includes low frequency and DC level components, which may stem from the manner in which video data is typically formatted. Although well-known in the art, a brief explanation of example formatting of video data is provided below.

In a typical camera, color is produced by filtering the light hitting each photosite (or pixel) to produce either red, green or blue values. The arrangement for the different colors (i.e., color pattern) of the photosites most often used is a so-called "Bayer pattern." RAW data of a single image acquired by a camera (where a video is a sequence of images) like this represents the value of each pixel, for pixels of different colors. In other words, for a single image, RAW data may include pixel values for all red pixels (i.e., pixels configured to filter the incoming light to detect wavelengths in the spectrum associated with red color), pixel values for all green pixels (i.e., pixels configured to filter the incoming light to detect wavelengths in the spectrum associated with green color), and pixel values for all blue pixels (i.e., pixels configured to filter the incoming light to detect wavelengths in the spectrum associated with blue color). Each pixel may be characterized by, inter alia, an intensity or magnitude, and is represented by a number of bits (e.g., 10 bits) used to represent a magnitude of a signal acquired/stored in a particular pixel for a particular component.

RAW data may be processed to form components which are then transmitted in a video signal. For example, red, green, and blue values, or some processed version of those values, are one example of different components of an acquired image, together referred to as "RGB" color space. RAW data may interpolated, a process known as de-mosaicking, and then be transformed to other types of color spaces by an ISP, e.g., in "YUV" color spaces, where Y is a luminance component, carrying the intensity of light information, and U and V are chrominance components, carrying the color information. A video frame may be composed of a matrix of individual pixels of one or more components. In some embodiments, different components may be transmitted by different channels. Unless specified otherwise, descriptions provided herein may refer to pixel values of a certain component or a combination of components.

The pixel values of a video frame (the pixel values or pixels sometimes referred to as "active pixels" to indicate that they contain values representing a video frame as acquired by a camera) may be grouped into horizontal lines, and these horizontal lines may be grouped, or stacked, vertically to form a video frame. The screen is built up scanline by scanline, by sending the pixel values, represented by appropriate component values (e.g., RGB or YUV values), over the video link. However, only having a stream of components, e.g., a stream of RGB colors, is not sufficient to know which part of the stream belongs to a particular pixel (e.g., the top-left pixel) on a display. To solve this, two more signals are added to the video signal containing the values of active pixels to be transmitted—one is a signal containing horizontal synchronization ("horizontal sync") pulses and another one is a signal containing vertical synchronization ("horizontal sync") pulses. A horizontal sync pulse provides a reference for different video lines (i.e., it provides an indication of a start-of-line point), while a vertical sync pulse provides a reference for different video frames (i.e., it provides an indication of a start-of-frame point). A horizontal sync pulse (or, simply, "horizontal sync") may be a pulse inserted into a video signal before a stream with pixel values for a given horizontal line begins or/and when a horizontal line is done (but is typically inserted before a horizontal line begins). In between two consecutive horizontal sync pulses active pixel data for the line (i.e., pixel values representative of the line of the video frame) is included. A vertical sync pulse (or, simply, "vertical sync," also sometimes referred to as a "vertical retrace") may be a pulse or sequence of pulses inserted into a video signal when all horizontal lines of a given video frame have been completed or/and when before horizontal lines of a new video frame begin. Thus, each frame boundary may be demarcated by a single vertical sync pulse or sequence of pulses. Since each line of a frame has the same number of pixels, the time between consecutive horizontal sync pulses is a constant. Since each full frame (i.e., a frame with all of its lines) has the same number of pixels, the time between consecutive vertical sync pulses is a constant. In this manner, horizontal and vertical sync pulses allow determination of which color component of the video signal belongs to which position to be displayed on the screen. All common analog video transmission schemes mimic this organization of the pixels in a frame and mark the start-of-line and start-of-frame times with a horizontal sync and vertical sync pulses, respectively.

FIG. 3 illustrates a simplified example of an analog (video) signal showing how horizontal sync pulses 300 may be included into the video signal to be transmitted. As shown in FIG. 3, between each two consecutive horizontal sync pulses 300, active pixel data may be included, labeled in FIG. 3 as video lines 302 and 304 (i.e., lines which carry the video data). The pulses 300 are referred to as horizontal sync pulses due to the fact that they indicate the starting point for the active pixel values that would be rendered as a horizontal pixel line. Vertical synchronization lines (not shown in this example) indicate the beginning of a new video frame (within which the plurality of subsequent horizontal pixel (data) lines will share a common vertical start point). Typically, but not necessarily, the horizontal sync pulses occupy the lowest portion of the signal range. A flat portion immediately before the horizontal sync pulse is referred to as a "front porch" and a horizontal portion immediately after the horizontal sync pulse is referred to as a "back porch", which portions are set to certain predefined signal levels (e.g., both may be set to a zero voltage level) and may then be used to identify the horizontal sync pulses.

The example of FIG. 3 shows an ideal transmission scenario in which the horizontal sync pulses maintain their original level. However, when these (electrical) pulses are transmitted over an AC-coupled coupled channel, their flatness or level may deteriorate (i.e., their constant magnitude throughout a specified duration will not be maintained and will deteriorate) because the coupling capacitor(s) will delay passage of the electrical charge, thereby causing what graphically appears like a drooping or sagging of the otherwise horizontal pulse (i.e., straight lines become curved). Such an undesirable effect caused by using the coupling capacitors is commonly referred to as a signal amplitude gain (SAG) effect (or simply "SAG" or "sagging"). The SAG effect can be characterized as a gradual increase or decrease in the level of the video signal across its horizontal (i.e., DC level) components in a way that is dependent on its amplitude. When a horizontal pulse is a low value, the SAG will result in the magnitude of the pulse gradually increasing. When a horizontal pulse is a high value, the SAG will result in the magnitude of the pulse gradually decreasing. While the first value of a horizontal pulse may remain unaffected, subsequent points gradually increase when the pulse is low or gradually decrease when the pulse is high. This effect is shown in FIG. 4, where the level of the horizontal sync pulses 400 are shown to droop or sag (hence, the terms "sagging" and "SAG effect") with respect to a reference line 406 which indicates the intended flat level. As can be seen in FIG. 4, the same behavior may be exhibited by the values of the active pixels.

The SAG effect originates from the fact that the coupling capacitor(s) used for AC coupling, in combination with the termination resistance, effectively act as high-pass filters, letting high frequency components through while altering the amplitude of lower frequency components. The magnitude of the effect depends on the total series capacitance of the one or more coupling capacitors, as well as the value of the termination impedance employed. This will naturally affect the quality of the transmitted low frequency signals, and is particularly detrimental to video signals, which are formatted to have a DC component, and may significantly impact the quality and fidelity of the rendered/displayed output.

The SAG effect can also significantly affect the timing data included in the video signal, in particular, it can shift DC levels of e.g. the front porch and the back porch of the horizontal sync signals used for extracting timing information that indicates beginning and end of different horizontal video lines. Therefore, typically, DC offset correction is performed on the received video signal in an attempt to restore the DC content that was compromised. A conventional DC offset correction includes a clamping scheme in which the DC level of the received video signal is accumulated, or averaged, over a number of consecutive digital samples (e.g., 8, 16, or 32 samples) of the sync pulse (i.e., the sync tip), front porch, or back porch regions of a video line, and then this computed average is compared with a certain predefined target value. The difference between the computed average and the predefined target is then used as a clamp offset signal and the next video line is adjusted by this clamp offset amount, thus realizing DC offset correction.

One drawback of such conventional implementation of DC offset correction for AC-coupled video signals is that any error in the measurements on the receiver side can result in a significant line-to-line uncorrected offset in the clamp offset value. Also, the bit depth, and therefore the precision, of the clamp adjustment is typically limited. As a result, conventional DC offset correction schemes still can result in visible patterns undesirably appearing in the final output video, where the brightness of the resulting image varies slightly but noticeably from line to line. This is particularly noticeable on regions of the picture with uniform color, when viewed in low ambient light, which is often the viewing environment for a display within a vehicle.

Using Metadata for DC Offset Correction

Embodiments of the present disclosure aim to provide an improvement on at least some of the limitations described above. To that end, several methods and devices are provided for the transmission of a video signal (which includes, in general, video/audio/image signal), in AC-coupled analog form, over a single wire (in a single-ended configuration, as described above) or, alternatively, over a differential pair of wires (in a differential-pair configuration, as described above) and for the reception of said video signal. In particular, embodiments of the present disclosure aim to provide an improvement in performing DC offset correction/clamping on signals, in particular video signals, transmitted over an AC-coupled link.

Systems, methods, devices, and non-transitory computer-readable media for encoding, transmitting, decoding and receiving one or more signals are described herein. The various embodiments of the present disclosure may be implemented or deployed alone or in combination. While exemplary embodiments are explained herein in relation to video information signals, various embodiments of the present disclosure may be applied to a diverse range of types of information signals, such as, but not limited to, video and audio information combination signals and combined media (e.g. video, audio, etc.) and control data signals, without departing from the scope of the present disclosure. Embodiments of the present disclosure may be implemented or deployed in a wide range of systems, applications, and/or environments, such as, but not limited to, automotive infotainment, ADAS, self-driving vehicles, security surveillance systems, and CCTV systems.

Figure 5:
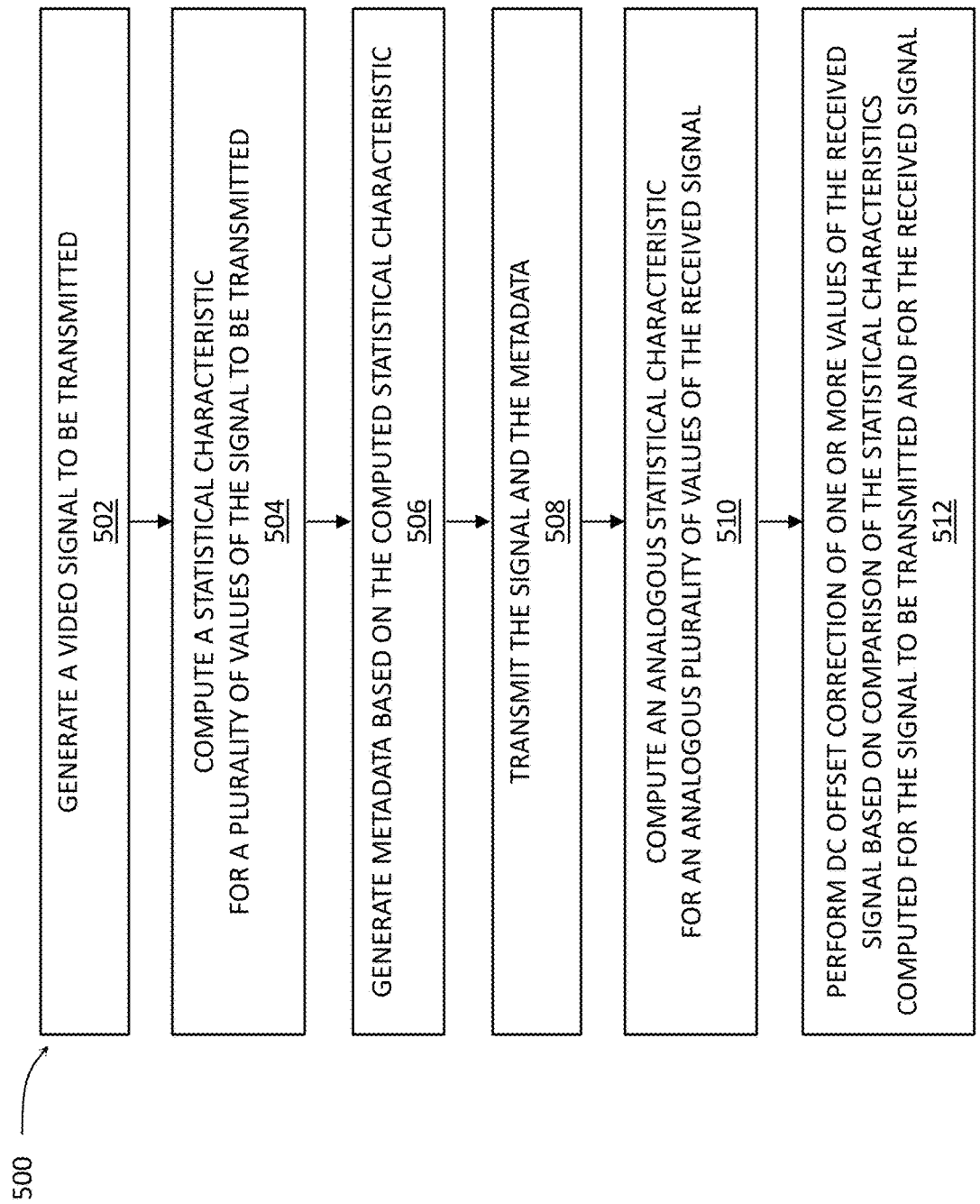
FIG. 5 is a flowchart of a method of using metadata for direct current (DC) offset correction of a video signal transmitted over an AC-coupled video link in accordance with some embodiments of the present disclosure.

FIG. 5 presents a flowchart of an example method 500 of operating a system, e.g., a video system, by using metadata for DC offset correction of an acquired or generated signal, e.g., an acquired or generated video signal, after the signal has been transmitted over an AC-coupled link, according to some embodiments of the present disclosure. The method 500 can be implemented using any video system in which a video signal is acquired by a camera or generated in any other manner on the transmitting side and is transmitted, by a transmitter, to a receiver, over an AC-coupled wired video link, to be processed, and possibly displayed on a display, on the receiving side. The method 500, in whole or in part, can be implemented using, for example, a video system 600 shown in FIG. 6, and/or a data processing system 700 shown in FIG. 7, described below. However, in general, the method 500 can be implemented using any system other than a video system, in which a signal acquired by a sensor, or generated in any other manner, on the transmitting side is transmitted, by a transmitter, to a receiver, over an AC-coupled wired link, to be processed and possibly reproduced on the receiving side.

The method 500 may begin with a block 502 where a video signal to be transmitted from a transmitter to a receiver over an AC-coupled link is generated. In some embodiments, the video signal may be generated by an image sensor, e.g., within a camera. In other embodiments, the video signal may be a computer-generated video signal, or a video signal provided from some other system. In some embodiments, a video signal to be transmitted from the receiver to the transmitter may be generated by a signal generator 612, shown in FIG. 6.

Figure 6:
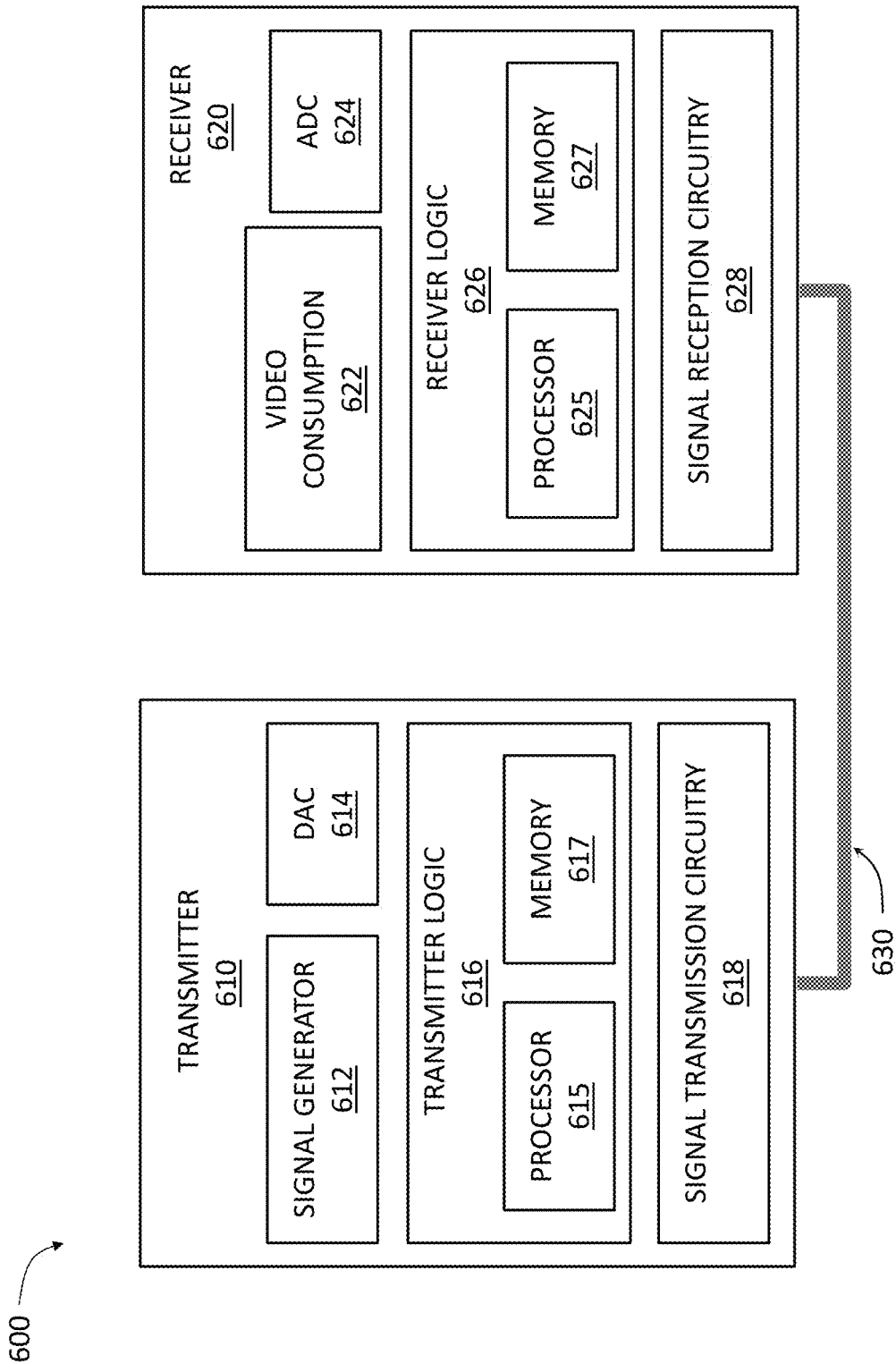
FIG. 6 provides a block diagram illustrating an example video system in accordance with some embodiments of the present disclosure.

In a block 504, the method 500 may include a transmitter, e.g., a transmitter logic 616 of the transmitter 610 shown in FIG. 6, in particular a processor 615 of the transmitter 610 shown in FIG. 6, computing a statistical characteristic for a plurality of values of the video signal generated at 502. "Statistical characteristic" is a term employed herein to refer to any suitable characteristic that describes, in a quantitative manner, pixel values of a portion of the video signal to be transmitted to the receiver. A transmitter and a receiver are in agreement as to how such a statistical characteristic is to be computed, and on which pixels of the video signal. Therefore, a comparison of such a statistical characteristic computed by the transmitter on the video signal to be transmitted and an analogous characteristic computed by the receiver on the video signal as received at the receiver, i.e., after the signal has been transmitted over an AC-coupled link, would provide a measure of the DC offset that the video signal has experienced due to the AC-coupled transmission. The receiver can then perform DC offset compensation on the received video signal based on outcome of the comparison. In this manner, the actual active pixel values of a video signal may advantageously be used in a clamping scheme, as opposed to only a small window of DC values such as the sync tip, front or back porch as was used in the conventional implementations of DC offset correction described above. Furthermore, the embodiments described herein enable do not need to assume certain predefined target values for any of the DC levels, as was also the case with the conventional implementations described above, but, rather, advantageously allow using dynamically computed "target" values (e.g., the statistical characteristic as computed by the transmitter being the "target" for performing clamping on the receiver side).

Guided by these general principles, there are many variations of how a statistical characteristic may be computed and provided from the transmitter to the receiver. Some of these variations are described below. However, in general, any statistical characteristic, computed in any manner in accordance with the principles described herein, and provided from the transmitter to the receiver in any form and over any communicative connection between the transmitter and the receiver, is within the scope of the present disclosure.

There are 3 aspects on which a transmitter and a receiver should be substantially in agreement on to benefit from the use of the statistical characteristic as described herein. The first aspect includes on which pixels of the video signal the statistical characteristic is to be computed. The second aspect includes how a statistical characteristic is to be computed, i.e. which mathematical operation is to be performed on the plurality of pixels identified/selected in accordance with the first aspect. The third aspect includes how the computed statistical characteristic computed by the transmitter is to be represented by so-called "metadata" that is then transmitted from the transmitter to the receiver to enable the receiver to perform the comparison and to further perform DC offset compensation based on the comparison. Each of these three aspects will now be described.

Regarding the first aspect, there is a balance to be achieved between the accuracy desired between the video signal as it was before the AC-coupled transmission and the video signal as it is recovered on the receiver side after the AC-coupled transmission. In some implementations, such balance may depend on the circumstances of a particular deployment scenario, e.g., computing power at the transmitter and/or the receiver, bandwidth limitations for transmitting metadata to the receiver, etc. In some embodiments, a statistical characteristic may be computed on all active pixels of each video line. Thus, one such statistical characteristic may be computed for each video line of a video frame. In other embodiments, a statistical characteristic may be computed on a certain subset of all active pixels of each video line (i.e., on a fraction of a single video line), e.g. for the first half of active pixels of each video line, or for a certain number of pixels centered substantially around a center of each video line, or for every even or every odd pixel of each video line, or on any other pixels chosen to be suitable for a particular deployment scenario. In such embodiments of a fraction of pixels of a video line used for computing a statistical characteristic, one such statistical characteristic may be computed, e.g., for each video line of a video frame. In yet other embodiments, a statistical characteristic is to be computed on pixels from two or more lines, e.g. for all pixels of two or more video lines of a video frame, or for some fractional amount of all pixels of two or more video lines (e.g. for the first half of all pixels of a first video line and the second half of all pixels of a second video line, or for all pixels of the first video line a certain number, e.g., half, of the pixels of the second video line). In such embodiments, one such statistical characteristic may be computed for every two or more video lines of a video frame, thus reducing the burden on both the computing resources used to compute the statistical characteristic and the bandwidth used for transmitting the statistical characteristic from the transmitter to the receiver, while potentially sacrificing the accuracy as the video signal may have pixel values that differ significantly from one line to another. In still other examples, a statistical characteristic may be computed on all pixels from all of the horizontal lines of a given video frame, or on all pixels of every other line of a video frame, or on certain other selected pixels across a given video frame, or even on pixels from two or more video frames.

Regarding the second aspect, in some embodiments, the statistical characteristic may include a mean or an average of value of a plurality of active pixels of the video signal that were selected according to the first item described above. In other embodiments, the statistical characteristic may include a sum of all pixel values of such a plurality of active pixels. In still other embodiments, the statistical characteristic may include a median of all pixel values, or any other numerical characteristic providing a useful indication of the pixel values of the selected pixels. It should be noted that, while descriptions provided below refer to a single statistical characteristic computed for a certain plurality of pixel values (which were selected, e.g., in accordance with the first aspect described above), in other embodiments, multiple such characteristics may be computed by the transmitter and the receiver for a given plurality of pixel values, and the DC offset correction may be performed based on one or more of these statistical characteristics. For example, in some embodiments, a transmitter may be configured to compute both an average value and a sum of a plurality of certain pixel values of a video signal, and then provide both the average and the sum to the receiver. Since the receiver is in agreement with the transmitter, the receiver would also compute both the average and the sum but now for the analogous pixels of the received video signal, and then perform DC offset correction based on comparison of each of these two different statistical characteristics as computed by the transmitter and the receiver.

Regarding the third aspect, "metadata" is a term used herein to describe some representation of the statistical characteristic computed by the transmitter, which metadata may be generated in block 506 of the method 500, e.g., by the processor 615 of the transmitter logic 616, from the statistical characteristic computed at block 504. Again, there are many possible variations of how metadata could be generated based on the statistical characteristic computed by the transmitter, all of which being within the scope of the present disclosure. In some embodiments, the metadata may simply include the statistical characteristic as it was computed by the transmitter. In other embodiments, the metadata may include some encoded version of the statistical characteristic computed by the transmitter. For example, the computed value of the statistical characteristic may be seen as being, or belonging to, one of a plurality of predefined levels, e.g. 10 levels, and the metadata may be an indication of the particular level to which the computed value corresponds. In still other embodiments, the metadata may be not a complete value of the statistical characteristic computed by the transmitter but only a certain number of the least significant bits (LSBs). For example, considering that the statistical characteristic computed by the transmitter may be a digital value having M bits, where M is equal to or greater than 2, then the metadata may be the N LSBs of the M-bit word of the statistical characteristic, where N is greater than zero and less than M (e.g., M could be equal to 7 and N could be equal to 3). Such embodiments are based on a realization that the values of the statistical characteristic computed at the transmitter and at the receiver are not expected to differ significantly, and that, therefore, providing only a certain number of LSBs from the transmitter to the receiver will be sufficient for the receiver to be able to determine how to modify the values of the received video signal based on the comparison of the LSBs represented by the metadata and the value of the statistical characteristic computed by the receiver.

Continuing with the method 500, at block 508, the method may include the transmitter transmitting both the video signal itself, in particular, the video signal generated at 502, and the metadata, in particular, the metadata generated at 506. The video signal would be transmitted over an AC-coupled link between the transmitter and the receiver, e.g., the AC-coupled link 630 shown in FIG. 6, whereas the metadata may or may not be transmitted over the same link. In some embodiments, the metadata may be transmitted by being included in the video signal, e.g., in the area designated for the front or back porch of the video signal, in the horizontal blanking interval, or in any other suitable location within the video signal, as long as the transmitter and the receiver both have information as to where the metadata is to be included/found within the video signal. In other embodiments, the metadata may be transmitted over a separate transmission/communication channel between the transmitter and the receiver, which may be either a wired or a wireless link.

It should be noted that, in various embodiments, the statistical characteristic and/or metadata may be computed by the transmitter and the receiver either in digital or in analog format. Similarly, when the metadata is transmitted from the transmitter to the receiver over a communication channel separate from the AC-coupled link over which the video signal itself is transmitted, the metadata may be transmitted either in digital or analog format. Therefore, although specific digital-to-analog and analog-to-digital conversions are not explicitly described herein for handling of the video signal for computing the statistical characteristic and the metadata by the transmitter and the receiver, these processes on as-needed basis are within the scope of the present disclosure, and the systems described herein, in particular the transmitter and the receiver of the video system, e.g., as shown in FIG. 6, would include suitable converters for performing the conversions between digital and analog formats. In some embodiments, it may be particularly advantageous to perform computation of, and comparison of the statistical characteristics in digital domain. In some such embodiments, the metadata generated in digital form could then be converted to analog form for transmission to the receiver over an AC-coupled transmission channel.

It should also be noted that in various embodiments, processes of blocks 504, 506, and 508 may be performed in different order than that shown in FIG. 5. For example, in some embodiments, a portion of the video signal may be transmitted from the transmitter to the receiver (a part of the block 508) before the statistical characteristic for it is computed (block 504) and/or before the metadata for it is generated (block 506). In such embodiments, the metadata may still be included within the video signal, but, e.g. if the metadata represents the statistical characteristic for a plurality of pixels of a given horizontal video line, such metadata may be included with a different video line, not the one for which it was computed. Again, as long as the transmitter and the receiver both have information and are in agreement as to how the metadata is generated and computed, all such different embodiments are within the scope of the present disclosure.

While blocks 502, 504, 506, and 508 of the method 500 were performed on the transmitting side of the video system (i.e., on the video signal that has not undergone the AC-coupled transmission), blocks 510 and 512 of the method 500 are to take place on the receiving side (i.e., on the video signal that has gone the AC-coupled transmission). Namely, block 510 takes place after the receiver, e.g. the receiver 620 shown in FIG. 6 (e.g., the signal reception circuitry 628 shown in FIG. 6), has received the video signal and the metadata transmitted by the transmitter at 508. At 510, the receiver, e.g. the receiver logic 626 shown in FIG. 6, is configured to compute an analogous statistical characteristic on the analogous plurality of pixels as the transmitter computed, but now on the pixel values as recovered/determined by the receiver from the received video signal. This is where the agreement between the transmitter and the receiver, described above, comes in: both the transmitter and the receiver compute the statistical characteristic in substantially the same manner, except that the transmitter does it for the pixel values of the video signal that has not undergone transmission over an AC-coupled link, while the receiver does it for the pixel values of the video signal after the video signal has been transmitted over such a transmission link.

At block 512, the receiver, e.g., the receiver logic 626 shown in FIG. 6, is configured to compare the statistical characteristic that the receiver computed to that computed by the transmitter (the latter being indicated by the metadata that the receiver received) and to perform DC offset correction of one or more values of the received video signal based on said comparison. For example, in some embodiments, the comparison may include simply determining the difference between the two values of the statistical characteristic, and DC offset correction may include clamping by shifting the one or more values of the received video signal by said difference. In other embodiments, the comparison may take more complicated forms, as long as the DC offset correction performed is decided to provide an improvement as to how the received video signal resembles that being transmitted by the transmitter. Thus, in various embodiments, the DC offset correction may include modifying the one or more values of the received video signal by values which are based on the computed difference between the two values of the statistical characteristic. When the computed difference is not equal to zero, this amounts to modification of the original values of the received video signal to some new values that account for the non-zero value of the computed difference. It should be noted that, as used herein, "computing the difference between the two values of the statistical characteristic" refers to computing other measures indicative of the difference between the two values of the statistical characteristic, e.g., computing a ratio between the two values of the statistical characteristic, all of which being within the scope of the present disclosure. The ratio not being equal to 1 is analogous to the difference not being equal to zero.

There are also many different embodiments as to which values of the received video signal the receiver is configured to correct at block 512. In some embodiments, the receiver may be configured to apply the DC offset correction to only those pixel values of the video signal on which the statistical characteristic was computed. In other embodiments, the receiver may be configured to apply the DC offset correction on a subset of those pixel values. In still other embodiments, the receiver may be configured to apply the DC offset correction on a larger number of pixels than those for which the statistical characteristic was computed. For example, the statistical characteristic may be computed for pixel values of every other line, and the receiver may be configured to apply the DC offset correction on both lines for each value of the statistical characteristic received. It should also be noted that the DC offset correction may be applied to the values of the video signal other than the pixel values, e.g., to the values of the sync signals (horizontal and/or vertical sync signals), front porches, and/or back porches of the sync signals, etc.

Although not specifically shown in FIG. 5, the method 500 may further include reproducing the received signal, once the appropriate DC offset correction has been performed. This may, e.g., include displaying the received video on a display.

To summarize, the method 500 provides a clamping scheme for AC-coupled signals, in particular AC-coupled video signals, which enables the entire video signal, rather than just a small window for example in the back porch of a horizontal sync pulse, to be used to determine the actual vs. target DC level of the video signal, resulting in increased accuracy and reduced line-to-line noise in the clamped video. This may be done by taking a measurement of the overall video level in the transmitter and transmitting this to the receiver as metadata either embedded as data in the video signal or over a side channel. For example, the metadata may directly or indirectly represent the average value (or any other suitable statistical characteristic) of all the active pixels in the video line (or a certain subset of two or more pixels in one or more video lines). A similar measurement may be made on the received signal in the receiver. The metadata may then be used to establish the correct offset value to ensure the received signal is adjusted to closely match the transmitted signal.

Example Video System

FIG. 6 illustrates an example video system 600, according to some embodiments of the present disclosure. As shown in FIG. 6, the example system 600 may include a transmitter 610 and a receiver 620 coupled by an AC-coupled link 630. The AC-coupled link 630 may be any suitable wired conductor cable, e.g., the single-ended conductor cable 108 or the differential-pair cable 208, described above.

As shown in FIG. 6, the transmitter 610 may include, or be communicatively coupled to, a video signal generator 612. The video signal generator 612 may include any suitable means for generating a signal to be transmitted to the receiver 620 over the AC-coupled link 630. For example, in some embodiments, the video signal generator 612 may include any suitable image sensor, image system processor or camera (which may include a plurality of cameras) configured to acquire a video signal (which may include a plurality of video signals). In other embodiments, the signal generator 612 may include means for producing a computer-generated video signal.

As further shown in FIG. 6, the transmitter 610 may also include, or be communicatively coupled to, one or more digital-to-analog converters (DACs) 614. As used herein, the term "DAC" refers to an electronic circuit/device that converts a digital value that represents an amplitude of a continuous physical quantity to a corresponding analog value. In some embodiments, the one or more DACs 614 may be configured to receive a digital signal generated by the signal generator 612, e.g., to receive a digital video signal comprising digital pixel values as acquired by the camera, and convert the digital values (i.e., discrete-time and discrete-amplitude values of the digital signal) to a continuous-time and continuous-amplitude analog signal. In some embodiments, the one or more DACs 614 may be configured to receive a processed version of the digital signal generated by the signal generator 612, e.g., as processed by the transmitter logic 616 to include metadata as described herein, and to convert that signal to analog domain for AC-coupled transmission to the receiver over the AC-coupled link 630.

In some embodiments, besides the one or more DACs 614, the transmitter 610 may include one or more analog-to-digital converters (ADCs) (not specifically shown in FIG. 6). As used herein, the term "ADC" refers to an electronic circuit/device that converts a continuous physical quantity carried by an analog signal to a digital number that represents the quantity's amplitude (or to a digital signal carrying that digital number). The result is a sequence of digital values (i.e., a digital signal) that has converted a continuous-time and continuous-amplitude analog input signal to a discrete-time and discrete-amplitude digital signal. Various converters included in the transmitter 610 may operate by being provided with clock signals generated by a clock generator (not specifically shown in FIG. 6), e.g., under the control of the processor 615.

As also shown in FIG. 6, the transmitter 610 may further include, or be communicatively coupled to, transmitter logic 616. The transmitter logic 616 may be implemented in hardware, software, firmware, or any suitable combination of the one or more of these, and may be configured to control the operation of the transmitter 610 as described herein. To that end, the transmitter logic 616 may make use of at least one processor 615 and at least one memory element 617 along with any other suitable hardware and/or software to enable its intended functionality of using metadata for performing DC offset correction on a signal transmitted over the AC-coupled link 630, as described herein. In some embodiments, the processor 615 can execute software or an algorithm to perform the activities as discussed in the present disclosure, e.g., the processor 615 can execute the algorithms that control digital-to-analog conversion of signals generated by the signal generator 612 for transmission over the analog transmission link 630. Furthermore, the processor 615 can execute algorithms that control generation and transmission of metadata to the receiver 620 as described herein. To that end, the processor 615 may be configured to receive pixel values of the signal generated by the signal generator 612, e.g., in the digital form as generated by the signal generator 612 and prior to the conversion to analog by the DAC 614, and compute one or more statistical characteristics of a plurality of pixel values. The processor 615 may also be configured to generate metadata representing the computed statistical characteristics, control transmission of the metadata, as well as control transmission of the AC-coupled analog signal, to the receiver 620, as described herein. Further descriptions of the processor 615 and the memory element 617 are provided below.

Also shown in FIG. 6 is that the transmitter 610 may also include, or be communicatively coupled to, signal transmission circuitry 618 for transmitting signals to the receiver 620. In particular, the signal transmission circuitry 618 may include components for enabling AC-coupled transmission of the analog video signal, e.g., as obtained from the DAC 614 and processed by the transmitter logic 616. In some embodiments, such components may include coupling capacitors, e.g., coupling capacitors on the transmitter side as described with reference to FIGS. 1 and 2, as well as any other circuitry as known in the art to be used for AC-coupled analog transmission of signals. In addition, the signal transmission circuitry 618 may further include components for enabling transmission of the metadata from the transmitter 610 to the receiver 620. As described herein, in various embodiments, such metadata may be transmitted either as a part of (i.e., included in) the signal to be transmitted in analog format over the AC-coupled link 630, or over a separate communication channel between the transmitter 610 and the receiver 620, which separate communication channel may be either wired or wireless.

Turning to the receiving side of the video system 600, as shown in FIG. 6, the receiver 620 may include, or be communicatively coupled to, signal reception circuitry 628, receiver logic 626, an analog-to-digital converter (ADC) 624, and, optionally, a video consumption device 622. The video consumption device 622, may, in some embodiments, be a video processing device such as an image system processor, a video analysis device, such as an ADAS processor, or a video rendering device such as a display.

The signal reception circuitry 628 may be configured to receive signals from the transmitter 610. In particular, the signal reception circuitry 628 may include components for enabling receipt of AC-coupled transmission of the analog video signal, e.g., to be provided to the ADC 624 for conversion to digital and to be provided to the receiver logic 626 for further processing, possibly after conversion by the ADC 624. In some embodiments, such components may include coupling capacitors, e.g., coupling capacitors on the receiver side as described with reference to FIGS. 1 and 2, as well as any other circuitry as known in the art to be used for reception of AC-coupled analog signals. In addition, the signal reception circuitry 628 may further include components for enabling receipt of the metadata from the transmitter 610. Again, as described herein, in various embodiments, such metadata may be transmitted either as a part of (i.e., included in) the signal to be transmitted in analog format over the AC-coupled link 630, or over a separate communication channel between the transmitter 610 and the receiver 620, which separate communication channel may be either wired or wireless.

As shown in FIG. 6, the receiver 620 may also include one or more ADCs 624. In case of the ADC 624 used in the video system 600, the analog input signal being converted may be the video signal transmitted from the transmitter 610 over the AC-coupled video link 630 and received by the signal reception circuitry 628, e.g., to be further processed in digital form by the receiver logic 626. In some embodiments, the receiver 620 may further include one or more DACs (not specifically shown in FIG. 6). Various converters included in the receiver 620 may operate by being provided with clock signals generated by a clock generator (not specifically shown in FIG. 6), e.g., under the control of the processor 625.

Similar to the transmitter logic 616, the receiver logic 626 may be implemented in hardware, software, firmware, or any suitable combination of the one or more of these, and may be configured to control the operation of the receiver 620, as described herein. To that end, the receiver logic 626 may make use of at least one processor 625 and at least one memory element 627 along with any other suitable hardware and/or software to enable its intended functionality of using metadata for performing DC offset correction on a signal transmitted over the AC-coupled link 630, as described herein. In some embodiments, the processor 625 can execute software or an algorithm to perform the activities as discussed in the present disclosure, e.g., the processor 625 can execute the algorithms that control analog-to-digital conversion of signals received by the signal reception circuitry 628 after having been transmitted over the analog transmission link 630, possibly after having been converted to digital domain by the ADC 624. Furthermore, the processor 625 can execute algorithms that control receipt and processing of metadata from the transmitter 610, as well as computation of analogous statistical characteristics by the receiver 620 and comparison of the statistical characteristics computed by the receiver 620 and the transmitter 610, as described herein. To that end, the processor 625 may be configured to receive pixel values of the signal received over the AC-coupled link 630, e.g., in the digital form as converted by the ADC 624, and compute one or more statistical characteristics of a plurality of pixel values. The processor 625 may also be configured to compare the computed characteristics with those included in the metadata received from the transmitter 610, as well as control adjustment of one or more values of the received signal to perform DC offset correction based on the comparison, as described herein. Further descriptions of the processor 625 and the memory element 627 are provided below.

Each of the processors 615, 625 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 615 may be communicatively coupled to the memory element 617, while the processor 625 may be communicatively coupled to the memory element 627, for example in a direct-memory access (DMA) configuration. Each of the memory elements 617, 627 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory items discussed herein should be construed as being encompassed within the broad term "memory element."

The information being tracked or sent to the one or more components/elements of the transmitter 610 and of the receiver 620 could be provided and/or stored in any database, register, control list, cache, or storage structure, all of which can be referenced at any suitable timeframe. Any such storage options may be included within the broad term "memory element" as used herein and may be used to implement the memory element 617 and/or memory element 627. Similarly, any of the potential processing elements, modules, and machines described herein should be construed as being encompassed within the broad term "processor" as used herein and may be used to implement processor 615 and/or the processor 625. Each of the elements shown in FIG. 6, e.g., the signal generator 612, the DAC 614, the transmitter logic 616, the video consumption 622, the ADC 624, or the receiver logic 626, can also include suitable interfaces for receiving, transmitting, and/or otherwise communicating data or information in a network environment, either over wired or a wireless communications link.

In certain example implementations, mechanisms for using metadata to perform DC offset correction of signals transmitted over an AC-coupled link as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 617 and 627 shown in FIG. 6, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processors 615 and 625 shown in FIG. 6, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

Example Data Processing System

Figure 7:
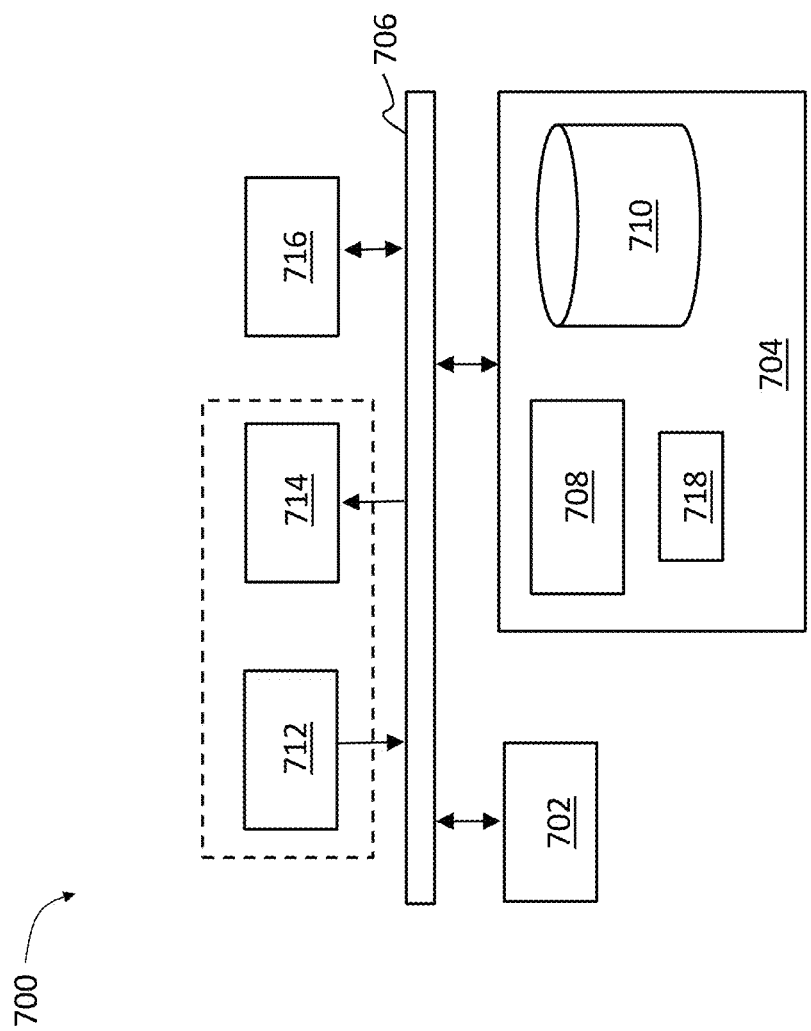
FIG. 7 provides a block diagram illustrating an example data processing system in accordance with some embodiments of the present disclosure.

FIG. 7 provides a block diagram illustrating an example data processing system for using metadata to perform DC offset correction of signals transmitted over an AC-coupled link as disclosed herein, according to some embodiments of the present disclosure. Such a data processing system could be configured to, e.g., function as the transmitter logic 616 and/or as the receiver logic 626 described herein or as any other system configured to implement various improved mechanisms related to DC offset correction using metadata for AC-coupled signals, as disclosed herein.

As shown in FIG. 7, the data processing system 700 may include at least one processor 702 coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within the present disclosure.

In some embodiments, the processor 702 may be the processor 615 and the memory elements 704 may be the memory elements 617 of the transmitter 610 of the video system 600 shown in FIG. 6, as described above. In some embodiments, the processor 702 may be the processor 625 and the memory elements 704 may be the memory elements 627 of the receiver 620 of the video system 600 shown in FIG. 6, as described above.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

When used in a video system according to various embodiments of the present disclosure, e.g. in the video system 600 shown in FIG. 6, the input device 712 may be used to receive input, e.g., as provided by a user, and to configure the video system 600 in accordance with the user input. For example, the input received by the input device 712 may specify one or more of the following: the type of a statistical characteristic to be computed by the transmitter 610 and the receiver 620, the position and the number of pixels to be used for the computation of the statistical characteristic (e.g., the input may indicate that half of the first pixels of every horizontal line of a video frame is to be used for computation of the statistical characteristic), how the metadata is to be generated based on the statistical characteristic computed by the transmitter 610 (e.g., the input may indicate that the metadata is to be generated as the 3 LSBs of the statistical characteristic computed by the transmitter 610), and how the metadata is to be transmitted from the transmitter 610 to the receiver 620 (e.g., the input may indicate that the metadata is to be included in the video signal to be transmitted in the analog form over the AC-coupled link 630 and/or specify where in the video signal the metadata is to be inserted). The transmitter 610 and the receiver 620 of the video system 600 may then be configured in accordance with the input received by the input device 712.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

When used in a video system according to various embodiments of the present disclosure, e.g. in the video system 600 shown in FIG. 6, the network adapter 716 may be used to receive input from other systems, computer systems, remote network devices, and/or remote storage devices through intervening private or public networks, and to configure the video system 600 in accordance with the received input. For example, the network adapter 716 may be configured to receive examples of input as described with reference to the input received by the input device 712 from the user, except that now it would be received from other systems, computer systems, remote network devices, and/or remote storage devices through intervening private or public networks. The transmitter 610 and the receiver 620 of the video system 600 may then be configured in accordance with the input received by the network adapter 716.

As pictured in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

SELECT EXAMPLES

Example 1 provides a system for transmitting a video signal over an AC-coupled video link, the system including one or both of a transmitter and a receiver. The transmitter is configured to compute a statistical characteristic for a group of active pixels of the video signal acquired by a camera, provide to the receiver the video signal over the AC-coupled video link, and provide to the receiver metadata indicative of the computed statistical characteristic. The receiver is configured to compute the statistical characteristic for the group of active pixels of the video signal received from the transmitter, and correct one or more values of the video signal received from the transmitter based on a difference between the statistical characteristic computed for the group of active pixels of the video signal received from the transmitter and the metadata received from the transmitter, where the video signal with the corrected one or more values to be displayed at a display, e.g. a display of, or associated with, the receiver.

Example 2 provides the system according to example 1, where the statistical characteristic is an average (or mean) of pixels values for the group of pixels.

Example 3 provides the system according to example 1, where the statistical characteristic is a sum of pixels values for the group of pixels.

Example 4 provides the system according to example 1, where the statistical characteristic is a median of pixels values for the group of pixels.

Example 5 provides the system according to any one of examples 1-4, where the group of pixels includes a plurality of pixels of a line, e.g. all pixels of a line or some fraction of all pixels of a line, of a video frame of the video signal.

Example 6 provides the system according to example 5, where the one or more values of the video signal which are corrected based on the metadata include a plurality of values of the line. Thus, in some embodiments, metadata indicative of the computed statistical characteristic of a group of pixels of a given line may be used to perform DC offset correction for values of the same line at the receiver side. In some embodiments, the plurality of values of the line to be corrected may include pixel values of the line, as received by the receiver. In some embodiments, the plurality of values of the line to be corrected may include other values associated with said line, e.g. values of the horizontal sync pulse associated with said line and/or values of the front and/or the back porch associated with said horizontal sync pulse.

Example 7 provides the system according to example 5, where the one or more values of the video signal which are corrected based on the metadata include a plurality of values of a different line. Thus, in some embodiments, metadata indicative of the computed statistical characteristic of a group of pixels of one line may be used to perform DC offset correction for values of a different line. In some embodiments, the plurality of values of the different line to be corrected may include pixel values of the different line, as received by the receiver. In some embodiments, the plurality of values of the different line to be corrected may include other values associated with said different line, e.g. values of the horizontal sync pulse associated with said different line and/or values of the front and/or the back porch associated with said horizontal sync pulse.

Example 8 provides the system according to any one of examples 5-7, where the transmitter is configured to compute the statistical characteristic and provide the metadata for each of a plurality of lines of the video frame, e.g. for each line of the video frame. The receiver is, correspondingly, configured to compute the statistical characteristic and perform the correction also for each of the plurality of lines, e.g. for each of the lines, of the video frame. In other embodiments, the statistical characteristic may be computed for a plurality of pixels of two or more lines, e.g. all pixels of each line of the two or more lines, or pixels of some fractional number of the two or more lines, e.g. pixels of 1.5 lines.

Example 9 provides the system according to any one of the preceding examples, where the metadata includes one or more LSBs of the computed statistical characteristic but does not include one or more most significant bits of the characteristic. Since the values of the video signal transmitted by the transmitter and received by the receiver are expected to differ only slightly, providing only the LSBs from the transmitter to the receiver is enough to enable receiver to compare the statistical characteristic that the receiver computed with the statistical characteristic that was computed by the transmitter, while advantageously reducing the volume of metadata that is to be transmitted from the transmitter to the receiver.

Example 10 provides the system according to any one of the preceding examples, where the transmitter is configured to provide the metadata to the receiver by including at least a portion of the metadata in the video signal.

Example 11 provides the system according to example 10, where the transmitter is configured to provide the metadata to the receiver by including at least a portion of the metadata in the video signal in one or more of a front porch and a back porch (i.e., in a front porch and/or in a back porch) of a horizontal sync pulse of a line of a video frame of the video signal.

Example 12 provides the system according to any one of the preceding examples, where the transmitter is configured to provide the metadata to the receiver by including at least a portion of the metadata in a signal transmitted separately from the video signal, e.g. transmitted over a separate transmission channel, which may be AC- or DC-coupled wired link, a wireless link, or any suitable communication channel between the transmitter and the receiver.

Example 13 provides a receiver for receiving a video signal over an AC-coupled video transmission line, the receiver including means for (e.g. a receiving circuit) receiving the video signal over the AC-coupled video transmission line/link, the video signal transmitted by a transmitter; means for (e.g. a receiving circuit) receiving metadata indicative of a statistical characteristic computed for a group of active pixels of the video signal before the video signal has been transmitted over the AC-coupled video transmission line (i.e. the metadata is indicative of the statistical characteristic computed on the values of the pixels of the video signal as they were before the video signal has been transmitted over the AC-coupled video transmission line and potentially degraded due to said transmission); means for (e.g., a processor, e.g. a hardware processor) computing the statistical characteristic for the group of active pixels of the video signal after the video signal has been transmitted over the AC-coupled video transmission line (i.e. the receiver computes the statistical characteristic on the values of the pixels of the video signal as they are after the video signal has been transmitted over the AC-coupled video transmission line and potentially degraded due to said transmission); and means for (e.g., a processor, e.g. a hardware processor) correcting one or more values of the video signal as received at the receiver based on comparison of the metadata and the statistical characteristic computed for the group of active pixels of the video signal after the video signal has been transmitted over the AC-coupled video transmission line. Optionally, the receiver may further include means for (e.g., a display) displaying the video signal with the corrected one or more values.

Example 14 provides the receiver according to example 13, where the receiver further includes means for deriving, from the received metadata, the statistical characteristic computed for the group of active pixels of the video signal before the video signal has been transmitted over the AC-coupled video transmission line, and where the comparison includes comparison of the statistical characteristic derived from the metadata and the statistical characteristic computed for the group of active pixels of the video signal after the video signal has been transmitted over the AC-coupled video transmission line.

Example 15 provides the receiver according to examples 13 or 14, where the metadata is received over the AC-coupled video transmission line.

Example 16 provides the receiver according to any one of examples 13-15, where the statistical characteristic is one or more of an average (or mean) of pixels values for the group of pixels, a sum of pixels values for the group of pixels, or a median of pixels values for the group of pixels.

Example 17 provides the receiver according to any one of examples 13-16, where correcting one or more values of the video signal as received at the receiver includes performing a DC offset correction on the video signal as received at the receiver.

Example 18 provides the receiver according to any one of examples 13-17, where the receiver is configured to operate as the receiver of/in the system according to any one of examples 1-12 and/or with the transmitter according to any one of examples 19-22 and/or according with the method of any one of examples 23-26.

Example 19 provides a transmitter for transmitting a video signal over an AC-coupled video transmission line, the transmitter including means for (e.g., a processor, e.g. a hardware processor) computing a statistical characteristic for a group of active pixels of the video signal before the video signal has been transmitted over the AC-coupled video transmission line (i.e. the transmitter computes the statistical characteristic on the values of the pixels of the video signal as they were before the video signal has been transmitted over the AC-coupled video transmission line and potentially degraded due to said transmission); means for (e.g., a processor, e.g. a hardware processor) generating metadata based on the computed statistical characteristic; means for (e.g. a transmitting circuit) transmitting the video signal to a receiver, where the video signal is transmitted over the AC-coupled video transmission line/link; and means for (e.g. a transmitting circuit) transmitting the metadata to the receiver.

Example 20 provides the transmitter according to example 19, where transmitting the metadata to the receiver include transmitting the metadata embedded in the video signal that is transmitted over the AC-coupled video transmission line.

Example 21 provides the transmitter according to examples 19 or 20, where the metadata enables the receiver to perform a DC offset correction.

Example 22 provides the transmitter according to any one of examples 19-21, where the transmitter is configured to operate as the transmitter of/in the system according to any one of examples 1-12 and/or with the receiver according to any one of examples 13-18 and/or according with the method of any one of examples 23-26.

Example 23 provides a method of operating an analog video transmission system, the method including computing a statistical characteristic for/on a first group of values, the first group of values including values of a group of active pixels of a video signal before the video signal has been transmitted over an AC-coupled video link; computing the statistical characteristic for/on a second group of values, the second group of values including values of the group of active pixels of the video signal after the video signal has been transmitted over the AC-coupled video link; and correcting one or more pixel values of the video signal that has been transmitted over the AC-coupled video link based on a comparison of the statistical characteristic computed for/on the first group of values and the statistical characteristic computed for/on the second group of values.

Example 24 provides the method according to example 23, where the comparison includes a difference between the statistical characteristic computed for/on the first group of values and the statistical characteristic computed for/on the second group of values.

Example 25 provides the method according to example 24, the one or more pixel values are corrected by adding the difference to each of the one or more pixel values.

Example 26 provides the method according to any one of examples 23-25, configured to operate with or in a system of a device in accordance to any one of the preceding examples.

Any one of the system, the transmitter, the receiver, and the method of any one of the preceding examples may be implemented in a vehicle or in a surveillance system. Furthermore, any one of the system, the transmitter, the receiver, and the method of any one of the preceding examples may include, or be communicatively coupled/connected to a camera configured to acquire the video signal to be transmitted over the AC-coupled link, where the camera may include a plurality of optical sensors (e.g. photodiodes) configured to generate pixel values of the video signal to be transmitted over the AC-coupled link.

Other Implementation Notes, Variations, and Applications

Principles and advantages discussed herein can be used in any device or system to implement a clamping scheme for an AC-coupled signal, e.g. an AC-coupled video signal, to perform DC offset correction of one or more values of the received signal. It is to be understood that not necessarily all objects or advantages mentioned herein may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be distributed or consolidated in any suitable manner. Along similar design alternatives, any of the illustrated components, modules, and elements of the FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to DC offset correction of AC-coupled signals using metadata, e.g. those summarized in the one or more processes shown in FIG. 5, illustrate only some of the possible functions that may be executed by, or within, the systems illustrated in the FIGS, e.g. the systems shown in FIGS. 6 and 7. Some of these operations may be deleted or removed where appropriate, or these operations may be modified or changed considerably without departing from the scope of the present disclosure. In addition, the timing of these operations may be altered considerably. The preceding operational flows, e.g. as shown in FIG. 5, have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the apparatus, device, or system described above may also be implemented with respect to the method or processes of using or operating said apparatus device, or system, and specifics in the examples provided for any of the apparatus, device, or system described herein may be used anywhere in corresponding methods or processes, and vice versa.

The invention claimed is:

1. A system for transmitting a video signal over a video link, the system comprising:
   a transmitter configured to:
      compute a statistical characteristic for a group of pixels of the video signal acquired by a camera,
      provide to the receiver the video signal over the video link, and provide to the receiver metadata indicative of the computed statistical characteristic; and
a receiver configured to:
compute the statistical characteristic for the group of pixels of the video signal received from the transmitter,
obtain the statistical characteristic computed by the transmitter from the metadata provided by the transmitter,
compute a value indicative of a difference between the statistical characteristic computed by the receiver and the statistical characteristic computed by the transmitter, and
correct one or more values of the video signal received from the transmitter by generating, for each original value of the one or more values, a corrected value, wherein the corrected value is equal to the original value modified by a value that is based on the computed value indicative of the difference.

2. The system according to claim 1, wherein the statistical characteristic is an average of pixels values for the group of pixels.

3. The system according to claim 1, wherein the statistical characteristic is a sum of pixels values for the group of pixels.

4. The system according to claim 1, wherein the statistical characteristic is a median of pixels values for the group of pixels.

5. The system according to claim 1, wherein the group of pixels includes a plurality of pixels of a line of a video frame of the video signal.

6. The system according to claim 5, wherein the one or more values of the video signal include a plurality of values of the line.

7. The system according to claim 5, wherein the one or more values of the video signal include a plurality of values of a different line.

8. The system according to claim 5, wherein the transmitter is configured to compute the statistical characteristic and provide the metadata for each of a plurality of lines of the video frame.

9. The system according to claim 1, wherein the computed statistical characteristic is an M-bit digital value and wherein the metadata includes N of one or more least significant bits of the computed statistical characteristic without including (M−N) most significant bits of the computed statistical characteristic, where N is less than M and greater than zero.

10. The system according to claim 1, wherein the transmitter is configured to provide the metadata to the receiver by including at least a portion of the metadata in the video signal.

11. The system according to claim 10, wherein the transmitter is configured to provide the metadata to the receiver by including at least a portion of the metadata in the video signal in one or more of a front porch and a back porch of a horizontal sync pulse of a line of a video frame of the video signal.

12. The system according to claim 1, wherein the transmitter is configured to provide the metadata to the receiver by including at least a portion of the metadata in a signal transmitted separately from the video signal.

13. A receiver for processing a video signal received over a video transmission line, the receiver comprising:
a circuit configured to obtain a statistical characteristic computed by a transmitter using values of a group of pixels of the video signal before the video signal was transmitted to the receiver;
a circuit configured to compute the statistical characteristic for the group of pixels of the video signal using values of the group of pixels after the video signal has been transmitted over the video transmission line;
a circuit configured to compute a value indicative of a difference between the statistical characteristic computed using the values of the group of pixels before the video signal was transmitted to the receiver and the statistical characteristic computed using the values of the group of pixels after the video signal has been transmitted over the video transmission line; and
a circuit configured to correct one or more values of the video signal after the video signal has been transmitted over the video transmission line by generating, for each original value of the one or more values, a corrected value, wherein the corrected value is based on the original value shifted by the computed value indicative of the difference.

14. The receiver according to claim 13, wherein:
the circuit configured to obtain the statistical characteristic computed by the transmitter includes a circuit configured to obtain metadata indicative of the statistical characteristic computed by the transmitter,
the statistical characteristic computed by the transmitter is an M-bit digital value, and
the metadata includes N of least significant bits of the statistical characteristic computed by the transmitter without including (M−N) most significant bits of the statistical characteristic computed by the transmitter, where N is less than M and greater than zero.

15. The receiver according to claim 13, wherein the receiver is configured to receive the metadata over the video transmission line.

16. The receiver according to claim 13, wherein the statistical characteristic is at least one of:
an average of pixels values for the group of pixels,
a sum of pixels values for the group of pixels, or
a median of pixels values for the group of pixels.

17. The receiver according to claim 13, wherein the video transmission line is an AC-coupled video transmission line.

18. A method of operating an analog video transmission system, the method comprising:
computing a statistical characteristic for a first group of values, the first group of values including values of a group of pixels of a video signal before the video signal has been transmitted over a video link;
computing the statistical characteristic for a second group of values, the second group of values including values of the group of pixels of the video signal after the video signal has been transmitted over the video link;
computing a value indicative of a difference between the statistical characteristic computed for the first group of values and the statistical characteristic computed for the second group of values; and
correcting one or more pixel values of the video signal that has been transmitted over the video link by generating, for each of the one or more pixel values, a corrected value, wherein the corrected value is based on the each of the one or more pixel values changed by the computed value indicative of the difference.

19. The method according to claim 18, wherein the video link is an AC-coupled video link.

20. The method according to claim 19, the one or more pixel values are corrected by adding the difference to the each of the one or more pixel values.

* * * * *